United States Patent [19]

Farrell et al.

[11] Patent Number: 4,533,527
[45] Date of Patent: Aug. 6, 1985

[54] TUNGSTEN RECOVERY FROM CARBIDES

[75] Inventors: George Farrell, Northwich; Diana M. Anderson, Runcorn; Michael E. Walton, Stockport, all of England

[73] Assignee: Interox Chemicals Limited, London, England

[21] Appl. No.: 523,956

[22] Filed: Aug. 17, 1983

[30] Foreign Application Priority Data

Sep. 4, 1982 [GB] United Kingdom ................. 8225261

[51] Int. Cl.$^3$ ............................................ C01G 41/00
[52] U.S. Cl. .......................................... 423/53; 423/55
[58] Field of Search ........................... 423/53, 55, 440

[56] References Cited

U.S. PATENT DOCUMENTS

| | | | |
|---|---|---|---|
| 2,485,175 | 10/1949 | Trapp | 423/53 |
| 2,704,240 | 3/1955 | Avery | 423/53 |
| 3,438,730 | 4/1969 | Shwayder | 423/53 |
| 4,406,866 | 9/1983 | Reilly | 423/53 |

FOREIGN PATENT DOCUMENTS

| | | |
|---|---|---|
| 5213408 | 7/1975 | Japan . |
| 21991 | 7/1975 | Japan . |

OTHER PUBLICATIONS

T. Artykvaev et al., "Solution of Tungsten Carbide in Hydrogen Peroxide", 1979, pp. 31–33.

*Primary Examiner*—H. T. Carter
*Attorney, Agent, or Firm*—Larson and Taylor

[57] ABSTRACT

Tungsten can be extracted into solution from tungsten carbide powder residues with aqueous hydrogen peroxide to a greater extent by employing in solution a catalytic quantity of hydrochloric acid, such as a mole ratio to the tungsten preferably in the range of at least 0.1:1 moles of HCl per mole tungsten, and often up to about 2.5 moles of HCl per mole of tungsten at 55° to 85° C. The selection of the mole ratio in practice usually takes into account the grade of tungsten carbide starting material. It is very preferable to use at least 7 moles hydrogen peroxide per mole of tungsten and an extraction temperature of 65° to 75° C.

8 Claims, No Drawings

TUNGSTEN RECOVERY FROM CARBIDES

The present invention relates to a process for the recovery of tungsten and more particularly to its recovery by dissolution from scrap.

Tungsten is a valuable and useful metal, but it is comparatively scarce so that there is increasing interest in processes for recovering tungsten from scrap materials containing it and in particular from one of its principal uses, tungsten carbide. It is possible to recover the tungsten by a pyrometallurgical process, but the substantial increases in the price of energy during recent years have provided a growing incentive for alternative processes to be sought, and in particular the aspiration has been for a process which could be operated using as little energy as possible and preferably at ambient pressure. In general, hydrometallurgical processes tend better to meet such desiderata.

Toya Soda Manufacturing KK proposed in Japanese Patent Application, publication No. 52-13408 to treat extra hard tungsten carbide alloy scraps with solutions of hydrogen peroxide in concentrentated hydrochloric acid. This, however, was solely as a preliminary stage, namely that of removing cobalt from the scrap material and the tungsten carbide remained undissolved at the end of the process. The advantage of the process was that the alloy had disintegrated into thin flakes. It was necessary to employ an alternative and subsequent method of recovering the tungsten from the tungsten carbide.

Subsequently, T Artykbaev et al of the Academy of Sciences of the Uzbek in Khimicheskie Zhurnal 1979 (2) pp 31–33 has described a process employing catalysed hydrogen peroxide for extracting tungsten from tungsten carbide. In their paper, they demonstrated that in the absence of catalyst, under their conditions chosen, they could recover no more than 10% of the tungsten, even using long extraction periods and hydrogen peroxide of around 20% w/w concentration. They were able to obtain some improvement in the extraction stage by using oxalic acid as a catalyst. This catalyst can interfere with what would otherwise be a most acceptable stage subsequently for recovery of tungsten from solution, namely its precipitation as an insoluble scheelite in that the oxalic acid can co-precipitate as calcium oxalate, thereby contaminating the product. For that reason, as well as the toxicity of oxalic acid, it is highly desirable that an alternative catalyst be found.

Accordingly it is an object of the present invention to provide a catalyst for the oxidative extraction of tungsten from tungsten carbide using hydrogen peroxide that would not form an insoluble co-precipitate during any subsequent scheelite precipitation.

Thirdly Japanese Patent Specification No. 50-21991 to the Applied Science Research Institute appears to offer directions for the recovery of tungsten from a hard alloy containing carbon using an aqueous acidic solution of hydrogen peroxide, of which one of the acids listed was hydrochloric acid. Their directions specify the use of a temperature of 25° to 50° C. with a performance peak at 40° C. and an optimum solvent composition of 4–5 mol % hydrochloric acid, 10–11 mol % of hydrogen peroxide and 84–85 mol % water. However, the instant inventors have found that use of the so called optimum solvent composition in conjunction with practical amounts of hydrogen peroxide when treating tungsten carbide powders can result in little improvement or even an impairment in the extent of tungsten extracted from the powdered tungsten carbide in comparison with a solution to which no hydrochloric has been added. The inventors investigations further revealed that it was necessary to control independently the mole ratios of hydrochloric acid to tungsten and hydrogen peroxide to tungsten instead of linking them as the Japanese specification sugqested. It was further found that once the mole ratios of the reagent and catalyst to tungsten were properly arranged, the profile of tungsten extractability against temperature was markedly different from that suggested by the Japanese. Accordingly, the specification does not provide a practical basis for extracting tungsten from tungsten carbide powder using hydrochloric acid catalysed hydrogen peroxide.

According to the present invention, there is provided a process for the recovery of tungsten from tungsten carbide in which tungsten carbide powder is contacted with excess hydrogen peroxide in aqueous solution in the presence of a catalytic amount of hydrochloric acid selected in the range of from 0.05 moles to 4 moles of hydrochloric acid per mole of tungsten at a temperature maintained in the range of 55° to 85° C. By the use of such a temperature range and a catalytic amount of the hydrochloric acid, the rate of extraction of tungsten into solution is accelerated and the overall porportion of tungsten that is so extracted is improved.

Herein, by the term catalytic amount of hydrochloric acid is meant no more than that amount at which its presence results in an improvement in tungsten extraction from tungsten carbide. It has been found in practice that the effect of hydrochloric acid addition to the hydrogen peroxide solution varies markedly as the mole ratio of hydrochloric acid to tungsten varies. As the mole ratio is increased, the extraction under otherwise identical conditions first is increased to a peak and thereafter decreases, even reaching significantly below the extraction obtained in the absence of added hydrochloric acid. Our present results indicate that an improvement can often be obtained in the range of from about 0.05 to 4 moles of hydrochloric acid per mole of tungsten, but it will be understood that to some extent the precise extent of the acceleration depends also upon the nature of the tungsten carbide starting material. Broadly speaking it would appear preferable to use a slightly higher mole ratio of HCl:W in respect of starting materials having a lower proportion of tungsten i.e. as the grade of material becomes lower. In the case of relatively high grade starting materials, such as those containing at least 80% w/w tungsten, the mole ratio is preferably at least 0.07 moles per mole and advantageously not more than 1 mole of hydrochloric acid per mole of tungsten with a preferred amount of at least 0.15 and preferably up to 0.35 moles per mole tungsten. For relatively low grade starting materials, such as those containing from 10 to 30% tungsten, it is preferable to employ at least 0.1 and especially at least 0.25 moles of hydrochloric acid per mole of tungsten and advantageously not more than 3, particularly not more than 2.5 moles HCl per mole of W. In the case of intermediate grade starting materials, the limits of the ranges are naturally likewise selected between the two extremes mentioned hereinbefore, approximately determinable by interpolation. For example, at 40–60% tungsten a convenient range is from 0.1 to 2 moles HCl per mole W, and especially 0.2 to 1 moles per mole. The hydrochloric acid is preferably added as such, but it can be generated in situ by reaction between a stronger acid such as sulphuric acid with a chloride salt such as sodium chloride.

When the hydrochloric acid is added the pH of the mixture of starting material and aqueous hydrogen peroxide falls, generally to below pH1. Similar pH control with other mineral acids to the same pH have not given the same effect.

The proportion of tungsten extracted from the tungsten carbide tends to increase as the relative amount of hydrogen peroxide employed is likewise increased. Consequently it is preferable to employ at least 5 moles of hydrogen peroxide per mole of tungsten, but naturally it will be recognised that to a certain extent at least the grade of the tungsten carbide starting material must also be taken into account, the purer the starting material, the lower the amount of hydrogen peroxide that can be used. It is of course a matter of commercial judgement as to whether the increased extent of tungsten extraction justifies the increased consumption of hydrogen peroxide. However, extractions of tungsten of the order of 80% or higher are in many cases attainable under the most preferred conditions employing at least 8 moles of hydrogen peroxide per mole of tungsten and in many embodiments the ratio is selected in the range of from 8 to 14 moles per mole of tungsten.

An advantageous feature of the present invention is that it can be carried out at the comparatively low temperatures of aqueous liquid systems thereby needing little or no external heating. The tungsten extracting solution and the tungsten carbide can be brought together at any temperature in the range of ambient to 85° C. The reactions occurring in the course of tungsten dissolution, or the possible hydrogen peroxide decomposition are exothermic, leading in general to an increase in temperature, which can advantageously allow a faster rate of reaction, and resulting in the solution reaching the minimum preferred temperature of at least 55° C. Where the hydrogen peroxide is added under such conditions that the minimum temperature is not attained naturally, an external source of heat can be employed, such as heating coils on a heated jacket around the reaction vessel. It is desirable to control any such increase in temperature to no higher than 85° C. in order to avoid an excessive wasteful decomposition of hydrogen peroxide, and reduction in the amount of tungsten extracted. It will be understood that methods of control can include the use of a cooling jacket around the reaction vessel or putting coils within the vessel or the control of the rate of introduction of the reactants such as hydrogen peroxide into the slurry of tungsten carbide and aqueous extractant. The preferred temperature range is 60° to 70° C. The optimum extraction temperature in practice is often found to be in the range of 65° to 77° C., typically excellent results being obtained at 70° and 75° C.

It will be understood that within certain limits, the pulp density of the tungsten carbide/aqueous extractant slurry is a matter for the discretion of the operator. In general the pulp density is selected within the range of 10 to 65%, parameters being taken into account including the impurity of the tungsten carbide, the amount of concentration of hydrogen peroxide and the amount and concentration of hydrochloric acid or precursors generating it. There are various ways of reaching such a pulp density, all of which are acceptable. For example, one way comprises slurrying powdered tungsten carbide with water, preferably demineralised, to a pulp density of around 50 to 70%, optionally in the presence of the desired concentration of hydrochloric acid, and thereafter introducing into the slurry either all at once or on increments or at a controlled rate the hydrogen peroxide solution. Another alternative includes preforming a solution containing the desired concentrations of hydrogen peroxide and hydrochloric acid and either introducing that onto powdered tungsten carbide or introducing the latter into it.

It is especially desirable to employ as the source of hydrogen peroxide, a concentrated aqueous solution containing at least 35 and preferably from 50 to 70% w/w hydrogen peroxide. By so doing, it is possible to employ the relatively high excess amount of hydrogen peroxide without resorting to unduly low pulp densities. Any commercial source of aqueous hydrogen peroxide can be used, and it can contain any of the well known stabilisers for acid conditions such as phosphates, phosphonates, aromatic alcohols and organic carboxylic acids.

In view of the fact that the hydrochloric acid represents only a small proportion of the mixture, it can be provided in any form from a dilute aqueous solution, for example one containing 0.5 moles per liter to concentrated solutions such as those containing 11 moles per liter.

The tungsten carbide powders from which the tungsten is extracted by the present process, need not be relatively pure. For example even though starting material containing 80 to 95% tungsten carbide can readily be treated, the invention process is equally capable of treating starting materials with very low tungsten carbide contents, such as from 10 to 30% by weight, and intermediate grades also. Where the tungsten carbide starting material contains cobalt in addition to tungsten, it is highly desirable for the starting material to be subjected beforehand to an acid wash, whereby substantially all the cobalt is extracted from the solution leaving behind a tungsten carbide residue. This can readily be carried out at ambient temperature, or higher if desired, using a substantial excess of acid over the stoichiometric amount. Thereby, the cobalt is readily separated from the tungsten, or otherwise it could be solubilised in the subsequent step with the tungsten. After such a wash, and solid/liquid separation, the starting material is usually washed with water.

The aqueous hydrogen peroxide and the solid tungsten carbide are generally brought into contact over a period of from one to 30 mins. Thereafter, the slurry is agitated for a contact period generally of at least 15 mins and desirably at least 30 mins. Often the contact period is selected within the range of 30 mins to 4 hours. Naturally, though, there can be overlap between the period of introduction of the reagents and the subsequent contact period, especially when the reagents are brought together only gradually.

After the tungsten has been extracted into solution, the latter is separated from the spent residue employing the conventional solid liquid separators such as filters, cyclones or settling tanks. The spent residue can then be washed with an alkali in order to remove any soluble tungstates. The washing can be combined with the aqueous solution of the tungsten.

Tungsten can be recovered in solid form from the aqueous solution by precipitation under alkaline conditions, particularly by the addition of a soluble calcium salt at around pH 10, resulting in the precipitation of scheelite. It will be recognised that the presence of residual chloride in the aqueous system does not interfere with the precipitation of scheelite in that calcium chloride is one of the most soluble calcium salts, whereas calcium oxalate is a typically insoluble calcium salt.

Having described the invention briefly in the foregoing passages, certain embodiments of the invention will now be described more fully by way of example only. It will be understood that the conditions of operation can be varied without departing from the spirit and scope of the present invention.

COMPARISONS 1, 9 AND 10 AND EXAMPLES 2 TO 8

These comparisons and Examples were each carried out using the following procedure on samples of low grade powder analysing as 19.9% tungsten, 3.75% cobalt and 0.16% iron, each as the metal, as measured by x-ray fluorescence, the residue of the sample being silicon carbide. Each sample was acid washed for 30 mins with aqueous hydrochloric acid (N) at ambient temperature. Subsequent analysis of the samples indicated that more than 98% of the cobalt had been removed each time. Each sample was then thoroughly washed with demineralised water. Samples of the washed tungsten carbide powder (10 g) were then slurried with 10 mls of demineralised water and then an aqueous solution of 50% w/w hydrogen peroxide was introduced into the slurry with mixing to provide 9 moles of hydrogen peroxide per mole of tungsten. The amount of hydrochloric acid specified in the Table was then added and the slurry continued to be agitated for a total of 3 hours. During the course of the reaction, generally after about 10 minutes, the slurry attained a temperature of 70° C., and was thereafter maintained at that temperature for the rest of the reaction period. The solid residue was then separated from the tungsten containing solution and washed at pH10 with N sodium hydroxide and the washing combined with the tungsten solution.

The tungsten content of the residue before and after extraction was measured, as was the tungsten concentration in the extractant solution, employing conventional x-ray fluorescence techniques for the residues and standard atomic absorbsion spectrophotometric techniques on the solutions.

TABLE 1

| Example/ comparison | Hydrochloric Acid Addition | | % W extracted |
|---|---|---|---|
| | Amount | Mole ratio to W in sample | |
| Comp 1 | Nil. | Nil | 58 |
| Ex 2 | 2 mls. N | 0.2:1 | 77 |
| Ex 3 | 3 mls. N | 0.3:1 | 90 |
| Ex 4 | 6 mls. N | 0.6:1 | 93 |
| Ex 5 | 10 mls. N | 1:1 | 91 |
| Ex 6 | 16 mls. N | 1.6:1 | 91 |
| Ex 7 | 24 mls. N | 2.4:1 | 84 |
| Ex 8 | 3 mls. 11N | 3.3:1 | 69 |
| Comp 9 | 6 mls. 11N | 6.6:1 | 48 |
| Comp 10 | 12 mls. 11N | 13.2:1 | 36 |

From the foregoing Table, it can be seen that the presence of hydrochloric acid plays a significant role in promoting or reducing the extent of Tungsten solution.

It will be recognised that the Japanese Patent Specification No. 50-21991 composition when used at a 9:1 mole ratio of hydrogen peroxide:tungsten yields a mole ratio of hydrochloric acid:tungsten midway between Ex 8 and Comp 9, so that employing a temperature of 70° C., i.e. a temperature well outside their stated range the proportion of tungsten extracted would be in essence the same as if no hydrochloric acid had been added, demonstrating that the specification gave no clear teaching applicable to the extraction of tungsten from powders.

When example 5 was repeated, but using a comparable amount of sulphuric acid giving a slurry having exactly the same pH as that obtained when hydrochloric acid was used, the resultant extraction of tungsten was worse even than when no acid was added. This clearly demonstrates that the promotion of tungsten extraction from powders cannot be explained by control of the pH of the system, but seems to be particularly favoured by hydrochloric acid.

When examples 5 and 6 and comparisons 9 and 10 were repeated, but employing only seven moles of hydrogen peroxide per mole of tungsten instead of the nine moles but otherwise employing identical conditions, exactly the same picture was obtained but in each case the extent of Tungsten extraction was reduced by about 30% from the earlier figures. This indicates that the same trend occured in the presence of less hydrogen peroxide, but that the overall extraction was reduced in each case.

Comparison 1 and examples 4, 5 and 6 were repeated, using the same conditions and amounts of reagents but instead employing as the tungsten carbide starting material a solid product analysing approximately 93% W/W tungsten carbide. Once again, the same trend was observed, in that the examples employing the preferred mole ratio of hydrochloric acid to tungsten extracted proportionately more tungsten from the tungsten carbide than did the comparison. The rate of introduction of hydrogen peroxide was controlled over a somewhat longer period in order to minimise the extent to which the temperature of the slurry rose. The best result of about 86% extraction was obtained at a mole ratio of HCl to W of approximately 0.4:1, falling respectively to about 79% and 69% at the mole ratios of about 0.6:1 and 0.9:1, and to about 80% at about 0.1:1. It can be seen from a plot of these latter results that the peak for the high grade starting material occurs at a ratio of about 0.25:1.

EXAMPLES 12 to 18 AND COMPARISON 11

In each comparison and Example, samples of tungsten carbide powder (5 g, 94% W) was added with constant agitation and slowly to a mixture of aqueous hydrogen peroxide (15.7 g, 50% w/w $H_2O_2$) water (10 mls) and hydrochloric acid solution (10 to 12 mls, N) providing an $H_2O_2$:W mole ratio of 9:1 and an HCl:W mole ratio of 0.23:1 to 0.28:1. The temperature of the resultant reaction mixture was maintained for 3 hours reaction time first by cooling and when necessary later by external heating to maintain the temperature specified in Table 2 below. At the end of the period, the mixture was rendered alkaline filtered, and excess calcium chloride added to the filtrate to precipitate synthetic scheelite ($CaWO_4$). The precipitate was subsequently analysed to indicate how much tungsten had been recovered.

TABLE 2

| Example/ Comparison | Temp °C. | Mole Ratio HCl:W | % W extracted |
|---|---|---|---|
| C11 | 35 | 0.25:1 | 43 |
| 12 | 55 | 0.23:1 | 75 |
| 13 | 60 | 0.25:1 | 77 |

TABLE 2-continued

| Example/Comparison | Temp °C. | Mole Ratio HCl:W | % W extracted |
| --- | --- | --- | --- |
| 14 | 65 | 0.28:1 | 75 |
| 15 | 70 | 0.23:1 | 80 |
| 16 | 75 | 0.23:1 | 81 |
| 17 | 80 | 0.23:1 | 75 |
| 18 | 85 | 0.25:1 | 54 |

From Table 2, it can be seen that the temperature of 35° C. offers only very poor extraction, but that the range of 55° to 80° C. is clearly extremely good, the results at 70° and 75° C. being the best.

We claim:

1. In a process for the recovery of tungsten from tungsten carbide in which tungsten carbide is contacted with excess hydrogen peroxide in aqueous solution to solubilize tungsten values the improvement in which the tungsten carbide is in powder form and the contact is effected in the presence of a catalytic amount of hydrochloric acid selected in the range of from 0.05 moles to 4 moles, of hydrochloric acid per mole of tungsten at a temperature maintained in the range of 55° to 85° C.

2. A process according to claim 1 employing hydrochloric acid in a range of mole ratios to tungsten in the starting material, the upper and lower limits of which range varies in accordance with the proportion of tungsten in the starting material from 0.1 to 3 moles HCl per mole W in low grade starting material to 0.07 to 1.0 moles HCl per mole W in high grade starting material.

3. A process according to claim 2 in which the amount of hydrochloric acid employed is selected in a range which varies from 0.25 to 2.5 moles HCl per mole W in low grade starting material to 0.15 to 0.35 moles HCl per mole W in high grade starting material.

4. A process according to claim 1 employing at least 7 moles hydrogen peroxide per mole of tungsten.

5. A process according to claim 1 in which the temperature of the slurry of tungsten carbide and aqueous hydrogen peroxide reaches a temperature of 60° to 80° C. and is thereafter maintained in that range.

6. A process according to claim 1 in which the tungsten content of the starting material is from 10 to 95% by weight.

7. A process according to claim 1 in which the starting material is subjected to a preliminary treatment with acid to remove cobalt therefrom.

8. A process according to claim 1 in which the solution of tungsten is subsequently separated from the spent starting material and then mixed with a calcium salt at an alkaline pH whereby scheelite precipitates.

* * * * *